(12) United States Patent
Akutsu et al.

(10) Patent No.: US 9,729,028 B2
(45) Date of Patent: Aug. 8, 2017

(54) ROTARY ELECTRIC MACHINE HAVING INTEGRATED DRIVE CONTROL DEVICE

(71) Applicants: Satoru Akutsu, Tokyo (JP); Isao Sonoda, Tokyo (JP); Yoshihito Asao, Tokyo (JP)

(72) Inventors: Satoru Akutsu, Tokyo (JP); Isao Sonoda, Tokyo (JP); Yoshihito Asao, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 110 days.

(21) Appl. No.: 14/409,039

(22) PCT Filed: Oct. 4, 2012

(86) PCT No.: PCT/JP2012/075816
§ 371 (c)(1),
(2) Date: Dec. 18, 2014

(87) PCT Pub. No.: WO2014/054155
PCT Pub. Date: Apr. 10, 2014

(65) Prior Publication Data
US 2016/0006324 A1 Jan. 7, 2016

(51) Int. Cl.
*H02K 11/00* (2016.01)
*H02K 7/00* (2006.01)
(Continued)

(52) U.S. Cl.
CPC ....... *H02K 11/0073* (2013.01); *B62D 5/0403* (2013.01); *B62D 5/046* (2013.01);
(Continued)

(58) Field of Classification Search
CPC ........ H02K 11/0073; H02K 5/04; H02K 5/06; H02K 5/15; H02K 7/003; H02K 11/33;
(Continued)

(56) References Cited

U.S. PATENT DOCUMENTS

| 5,086,244 A | 2/1992 | Isozumi |
| 6,023,838 A * | 2/2000 | Yamakoshi ............... H02K 5/04 29/596 |

(Continued)

FOREIGN PATENT DOCUMENTS

| DE | 3843967 A1 * | 6/1990 | ................ B60S 1/08 |
| DE | 102005060282 A1 | 3/2007 | |

(Continued)

OTHER PUBLICATIONS

Translation of foreign document DE 3843967 A1 (Year: 1990).*

(Continued)

*Primary Examiner* — Alex W Mok
(74) *Attorney, Agent, or Firm* — Sughrue Mion, PLLC; Richard C. Turner

(57) ABSTRACT

In a rotary electric machine having an integrated drive control device, a motor housing joined to a mounting housing, which is a cast member, is made of a steel material. Therefore, an outer diameter is reduced and strength for retaining a stator core is satisfactorily ensured even under high-temperature environments.

5 Claims, 7 Drawing Sheets

(51) Int. Cl.
  *B62D 5/04* (2006.01)
  *H02K 5/06* (2006.01)
  *H02K 5/15* (2006.01)
  *H02K 5/04* (2006.01)
  *F04B 17/03* (2006.01)
  *F04B 35/04* (2006.01)
  *F04B 39/12* (2006.01)
  *F04B 53/16* (2006.01)
  *H02K 11/33* (2016.01)

(52) U.S. Cl.
  CPC .............. *F04B 17/03* (2013.01); *F04B 35/04* (2013.01); *F04B 39/121* (2013.01); *F04B 53/16* (2013.01); *H02K 5/04* (2013.01); *H02K 5/06* (2013.01); *H02K 5/15* (2013.01); *H02K 7/003* (2013.01); *H02K 11/33* (2016.01)

(58) Field of Classification Search
  CPC ....... B62D 5/0403; B62D 5/046; F04B 17/03; F04B 35/04; F04B 39/121; F04B 53/16
  USPC .................................................. 310/67 R, 89
  See application file for complete search history.

(56) References Cited

U.S. PATENT DOCUMENTS

| | | | | |
|---|---|---|---|---|
| 6,215,215 | B1* | 4/2001 | Huber .................. | B60T 8/4022 310/86 |
| 6,429,553 | B1* | 8/2002 | Taniguchi ............ | B62D 5/0406 180/400 |
| 6,548,972 | B2* | 4/2003 | Takagi ................. | B62D 5/0406 318/293 |
| 7,414,339 | B2* | 8/2008 | Kitamura .................. | H02K 9/06 310/58 |
| 7,511,399 | B2 | 3/2009 | Lung et al. | |
| 2006/0087183 | A1* | 4/2006 | Tanaka ..................... | H02K 5/02 310/89 |
| 2008/0017438 | A1* | 1/2008 | Kanda .................. | B62D 5/0403 180/443 |
| 2010/0327680 | A1* | 12/2010 | Miyachi ............... | B62D 5/0406 310/71 |
| 2011/0285225 | A1 | 11/2011 | Matsuda et al. | |
| 2012/0161590 | A1* | 6/2012 | Yamasaki ............... | H02K 5/225 310/68 B |

FOREIGN PATENT DOCUMENTS

| | | | | |
|---|---|---|---|---|
| DE | WO 2010081594 A1 * | 7/2010 | ........... | B62D 5/0406 |
| DE | WO 2012055462 A2 * | 5/2012 | ............... | H02K 5/15 |
| DE | WO 2012059154 A2 * | 5/2012 | ............... | H02K 5/15 |
| FR | 2473806 A1 | 7/1981 | | |
| JP | 56-107754 A | 8/1981 | | |
| JP | WO 8907361 A1 * | 8/1989 | ............. | H02K 1/185 |
| JP | 9-308173 A | 11/1997 | | |
| JP | 2002-345211 A | 11/2002 | | |
| JP | 3614380 B2 | 1/2005 | | |
| JP | 2008-104321 A | 5/2008 | | |
| JP | 2009-5489 A | 1/2009 | | |
| JP | 2009-060760 A | 3/2009 | | |
| JP | 2009-284679 A | 12/2009 | | |
| JP | 2010-041870 A | 2/2010 | | |
| JP | 2010063344 A | 3/2010 | | |
| JP | 2011-83064 A | 4/2011 | | |
| JP | 2012-515524 A | 7/2012 | | |
| JP | 2012-152091 A | 8/2012 | | |

OTHER PUBLICATIONS

International Search Report of PCT/JP2012/075816 dated Nov. 20, 2012 [PCT/ISA/210].
Communication dated Jan. 19, 2016, from the Japanese Patent Office in counterpart application No. 2014-539542.
Communication dated May 3, 2016 from the European Patent Office issued in corresponding Application No. 12886056.6.

* cited by examiner

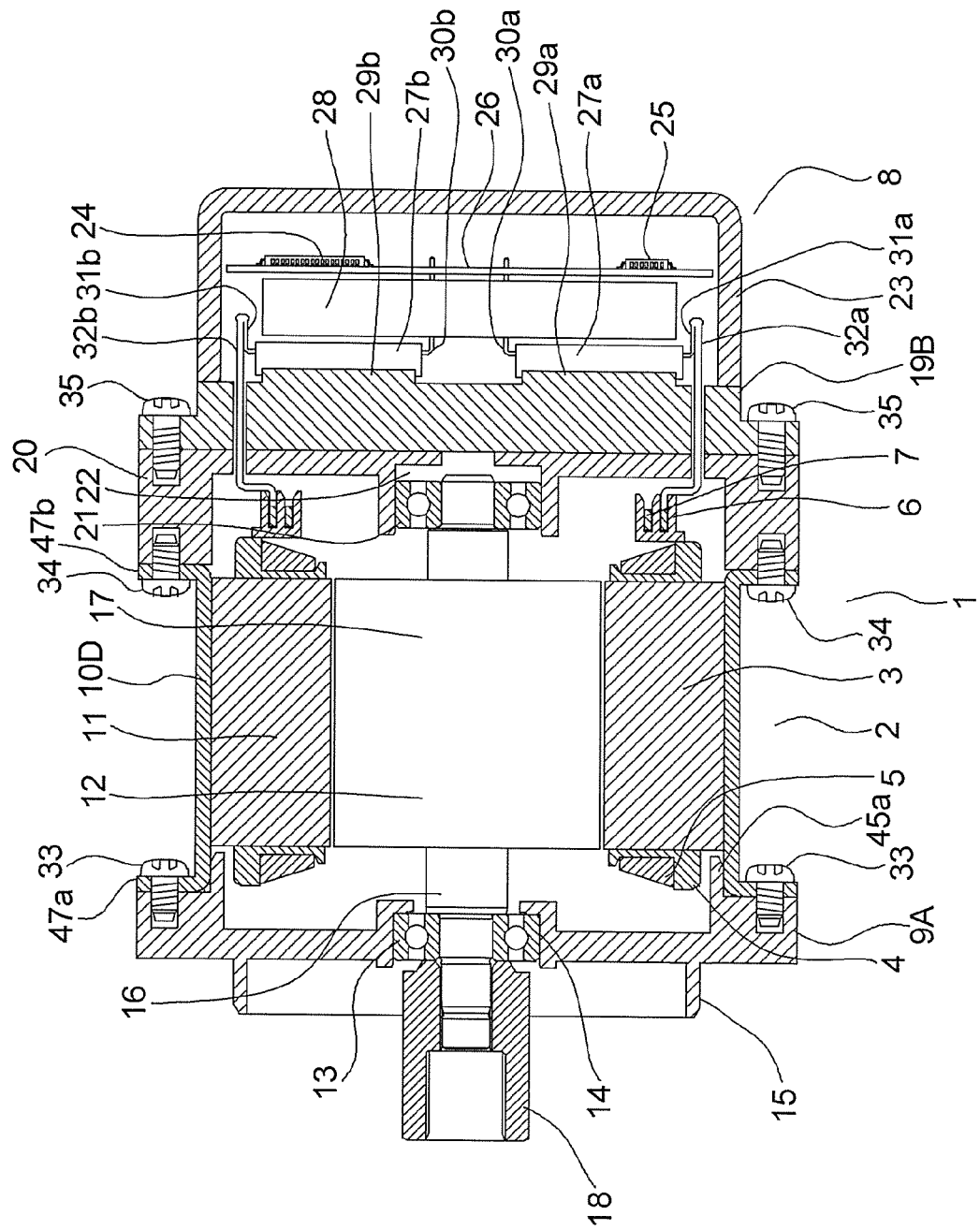

ROTARY ELECTRIC MACHINE HAVING INTEGRATED DRIVE CONTROL DEVICE

CROSS REFERENCE TO RELATED APPLICATIONS

This application is a National Stage of International Application No. PCT/JP2012/075816, filed Oct. 4, 2012, the contents of which are incorporated herein by reference in its entirety.

TECHNICAL FIELD

The present invention relates to a rotary electric machine having an integrated drive control device, in which a motor and a drive control device for controlling drive of the motor are integrated with each other.

BACKGROUND ART

As a related-art rotary electric machine having an integrated drive control device, there is known a rotary electric machine including a motor housing (housing 12 in Patent Literature 1) for housing a stator core of a motor, which is formed by aluminum die-casting (see, for example, Patent Literature 1).

CITATION LIST

Patent Literature

[PTL 1] JP 2012-515524 A (page 8, FIG. 1)

SUMMARY OF INVENTION

Technical Problems

In the rotary electric machine having an integrated drive control device described in Patent Literature 1, in which the motor and the drive control device for controlling the drive of the motor are integrated with each other, the motor housing for housing the stator core of the motor is formed by the aluminum die-casting.

Therefore, a plate thickness of the motor housing is required to be set large so as to ensure strength. Therefore, there is a problem in that an outer diameter of the rotary electric machine having an integrated drive control device increases.

Moreover, a gap is generated between the stator core and the motor housing due to a difference in linear expansion coefficient between the stator core formed of an iron-based material and the motor housing formed by the aluminum die-casting. Therefore, there is another problem in that strength for retaining the stator core is lowered under high-temperature environments.

The present invention has been made to solve the problems described above and has an object to provide a rotary electric machine having an integrated drive control device, which has a small outer diameter and satisfactorily ensured strength for retaining a stator core even under high-temperature environments.

Solution to Problems

According to one embodiment of the present invention, there is provided a rotary electric machine having an integrated drive control device, the rotary electric machine including:

a motor; and
a drive control device provided on another end portion side of an output shaft of the motor, which is opposite to an output mechanism provided on one end portion side of the output shaft of the motor, for controlling drive of the motor, the motor and the drive control device being provided so as to be integrated with each other,
the motor including:
a stator including a stator core formed by laminating thin steel plates, around which a stator winding is wound;
a rotator having the output shaft extending along a center axial line, and being provided rotatably on an inner-diameter side of the stator;
a motor housing having a cylindrical shape, for housing the stator core therein; and
a mounting housing being provided on the one end portion side of the output shaft so as to close an opening portion of the motor housing, and having mounted thereto an output mechanism housing for housing the output mechanism therein,
the motor housing being made of a steel material,
the mounting housing including a cast member.

Advantageous Effects of Invention

According to the rotary electric machine having an integrated drive control device according to one embodiment of the present invention, the motor housing joined to the mounting housing, which is the cast member, is made of the steel material. Therefore, the rotary electric machine having an integrated drive control device, which has the small outer diameter and the satisfactorily ensured strength for retaining the stator core even under the high-temperature environments, can be obtained.

BRIEF DESCRIPTION OF DRAWINGS

FIG. 7 is a sectional view illustrating an electric power steering device 1 according to a fourth embodiment of the present invention, which is cut along an axial direction.

DESCRIPTION OF EMBODIMENTS

Figure 1:
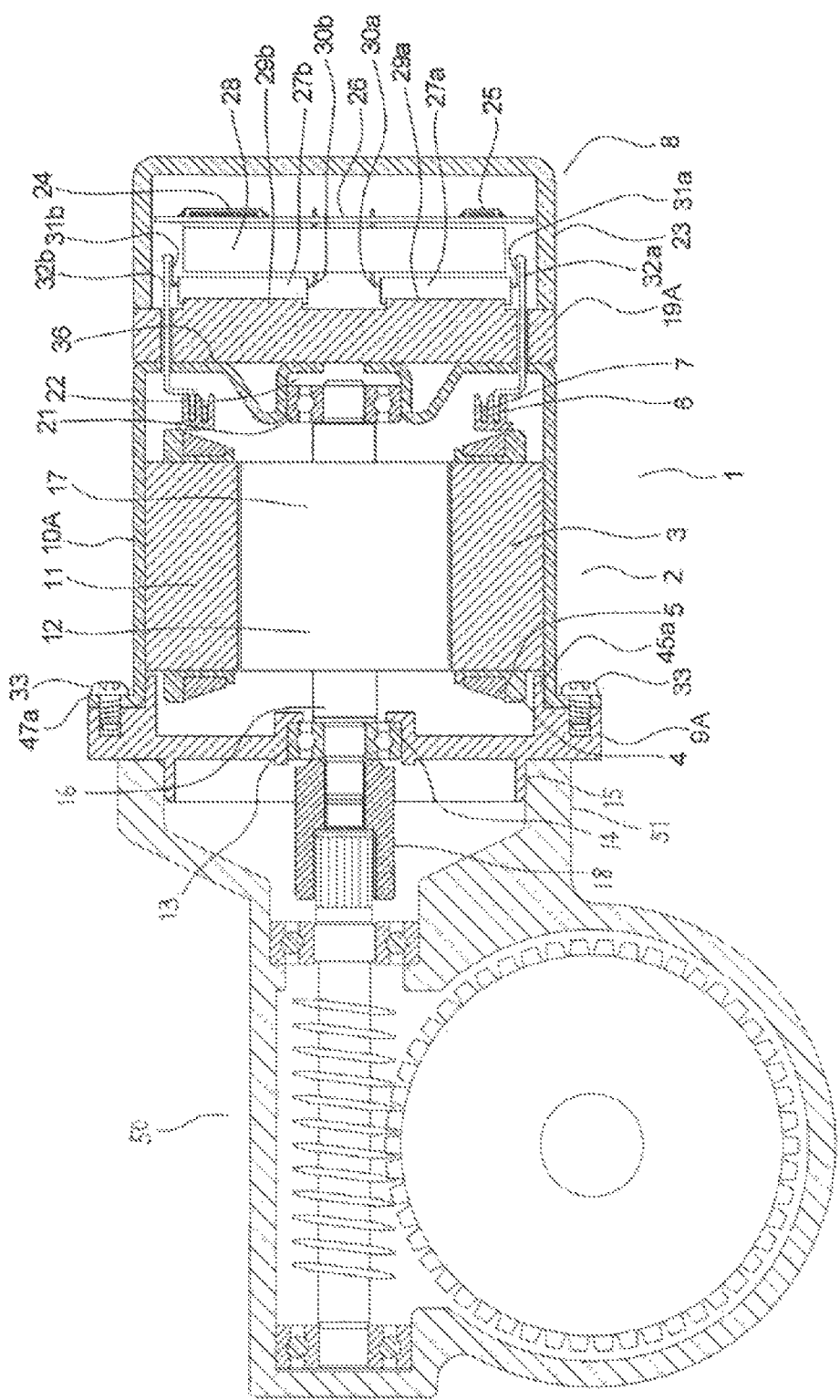
FIG. 1 is a sectional view illustrating an electric power steering device according to a first embodiment of the present invention, which is cut along an axial direction.

Now, an electric power steering device according to each of embodiments of the present invention is described referring to the drawings. In the drawings, the same or corresponding members and parts are denoted by the same reference symbols for description.

First Embodiment

Figure 2:
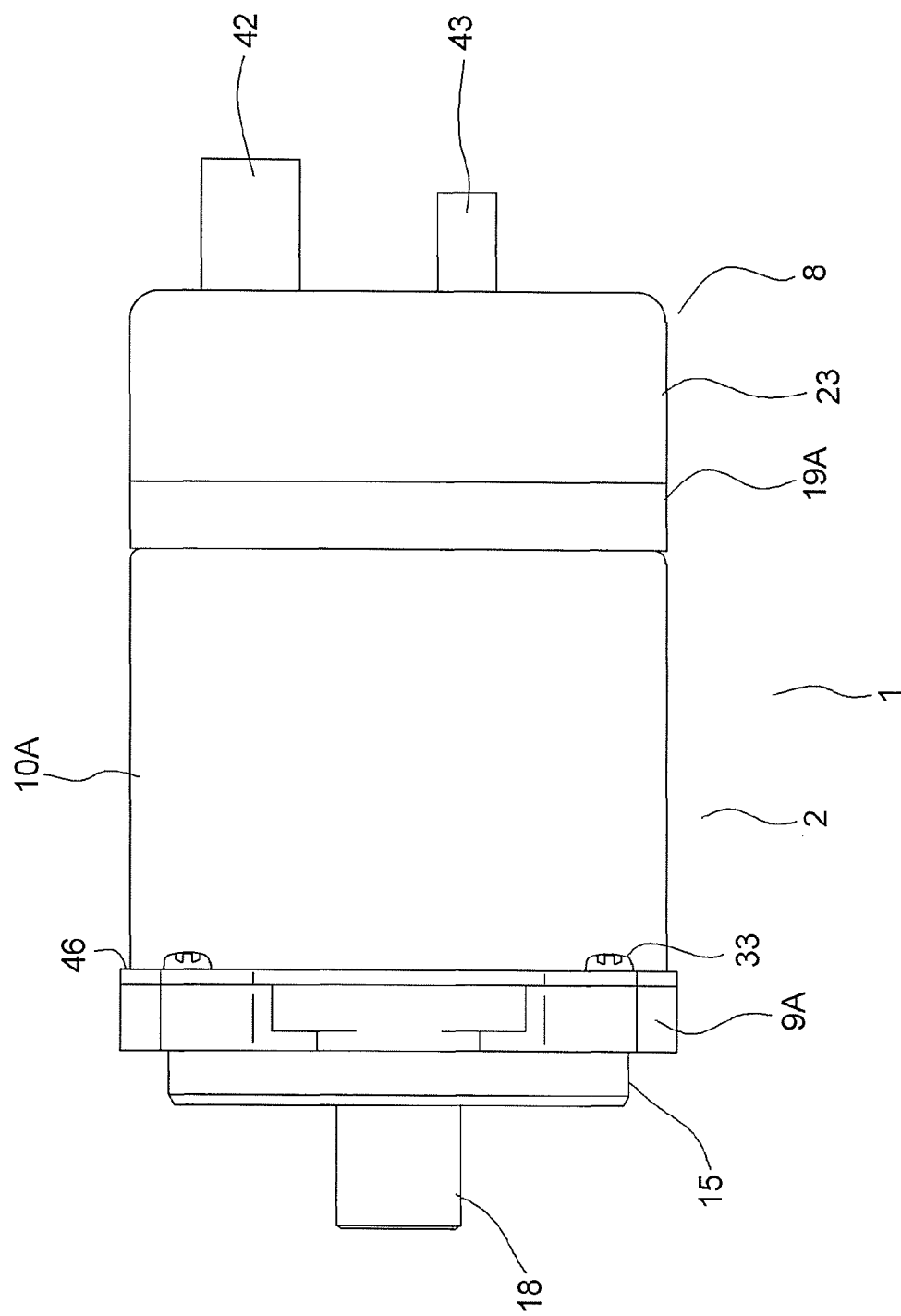
FIG. 2 is a side view of FIG. 1.
Figure 3:
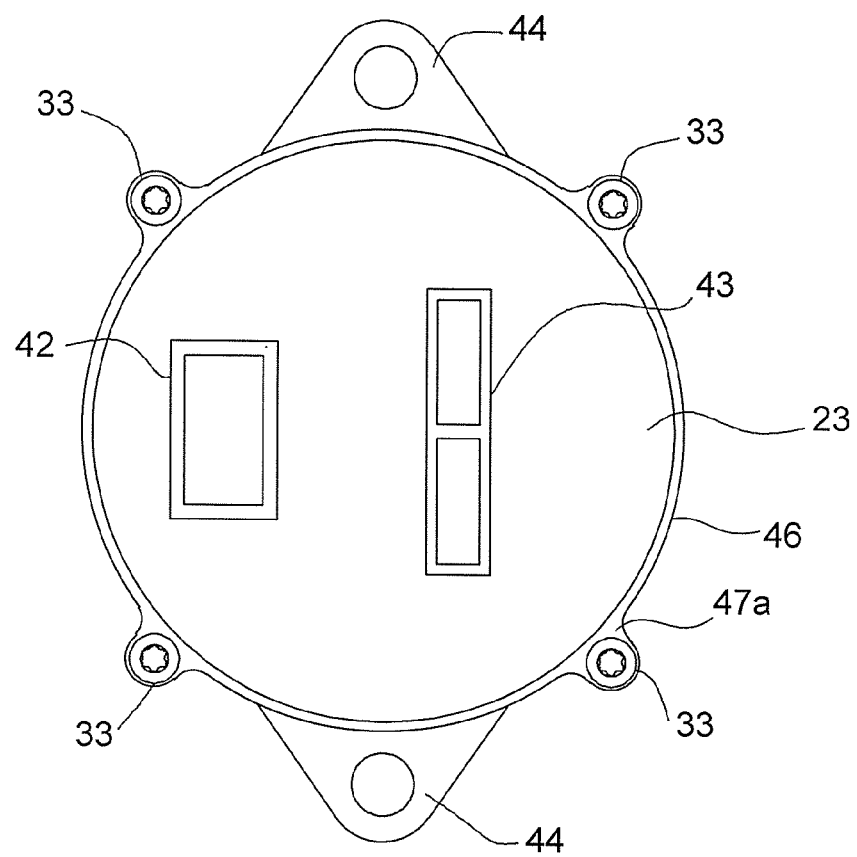
FIG. 3 is a plan view of the electric power steering device 1 illustrated in FIG. 1, as viewed from a drive control device side.
Figure 4:
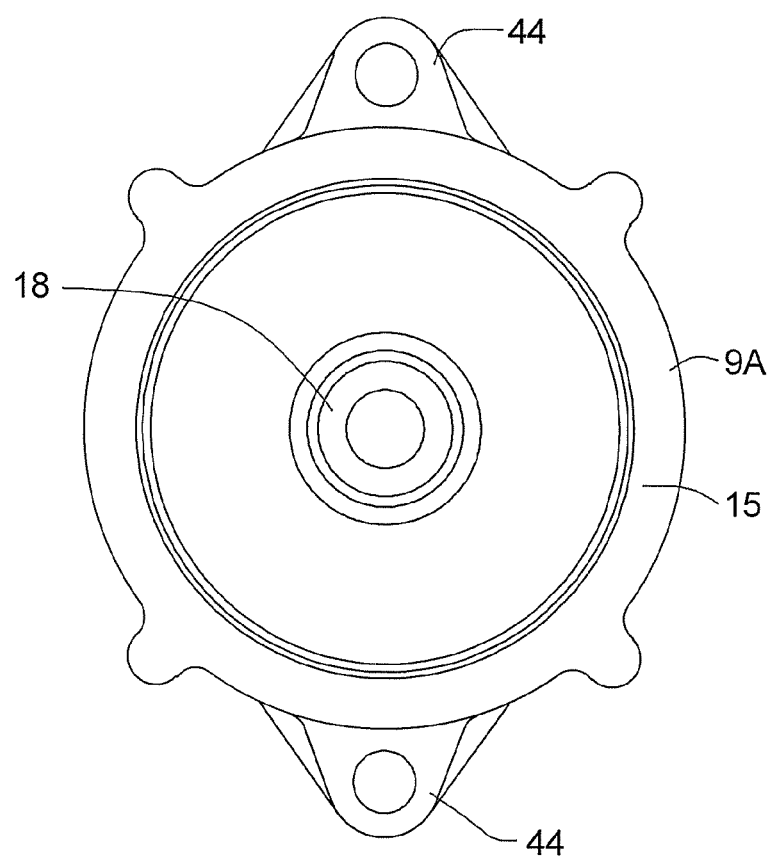
FIG. 4 is a plan view of the electric power steering device 1 according to the first embodiment of the present invention, as viewed from a mounting housing side.

FIG. 1 is a sectional view illustrating an electric power steering device 1 according to a first embodiment of the present invention, which is cut along an axial direction, FIG. 2 is a side view of FIG. 1, FIG. 3 is a plan view of the electric power steering device 1 illustrated in FIG. 1, as viewed from a drive control device 8 side, and FIG. 4 is a plan view of the electric power steering device 1 according to the first embodiment of the present invention, as viewed from a mounting housing 9A side.

In the electric power steering device 1 being a rotary electric machine having an integrated drive control device, a motor 2 and a drive control device 8 for controlling drive of the motor 2 are integrated with each other. The drive control device 8 is provided on another end portion side of an output shaft 16, which is opposite to a speed-reduction mechanism being an output mechanism 50 provided on one end portion side.

The motor 2 is a permanent-magnet synchronous motor, and includes a stator 11 and a rotator 12 provided on an inner-diameter side of the stator 11 with a gap therebetween so as to be rotatable.

The stator 11 includes a stator core 3 formed by laminating electromagnetic steel plates, two sets of three-phase stator windings 5 wound around slots (not shown), which are formed in the stator core 3 so as to extend in the axial direction, through intermediation of insulators 4 made of a resin, a terminal holder 6 made of a resin provided on an end surface of the stator core 3, which is on the drive control device 8 side, winding terminals 7 received in the terminal holder 6, for connecting the stator windings 5 of each of the sets in a Y- or delta-connection, and motor terminals 32a and 32b, each having one end portion connected to the winding terminal 7 and another end portion electrically connected to the drive control device 8.

The stator 12 includes the output shaft 16 having a larger middle portion, a magnet 17 mounted on an outer circumferential surface of the middle portion of the output shaft 16, for generating a magnetic field, and a boss 18, which is a coupling mounted to the one end portion of the output shaft 16, for coupling to the speed-reduction mechanism.

A motor housing 10A formed by using a cold rolled steel plate made of a steel material is fitted over the stator core 3. The motor housing 10A has a cylindrical shape with an opening portion on the speed-reduction mechanism side and a closed end on the drive control device 8 side. In a central portion of a bottom portion of the motor housing 10A, a rear bearing box portion 22, which houses a rear bearing 21 for rotationally supporting the another end portion of the output shaft 16, is formed.

A rib 46, which projects radially, is formed along the entire circumference of an outer circumferential edge portion of the opening portion of the motor housing 10A. Moreover, mounting flanges 47a, which project radially, are formed at four positions on the outer circumferential edge portion.

The opening portion of the motor housing 10A is closed by a mounting housing 9A onto which an output mechanism housing 51 for housing the speed-reduction mechanism therein is mounted. The mounting housing 9A, which is a die-cast product made of an aluminum alloy, includes a fitting portion 45a formed so as to extend in the axial direction. The motor housing 10A is joined to the mounting housing 9A by fixing screws 33, which are joint means, through the mounting flanges 47a. In a region in which the motor housing 10A and the mounting flanges 47a are joined to each other, the fitting portion 45a is held in close contact with an inner circumferential wall surface of the opening portion of the motor housing 10A.

The mounting housing 9A includes a front bearing box portion 14 formed in a central portion thereof. In the front bearing box portion 14, a front bearing 13 for rotationally supporting the one end portion of the output shaft 16 of the rotator 12 is housed.

The mounting housing 9A includes mounting flanges 44 formed at two positions, which radially project so as to be opposed to each other, and a fitting portion 15 for mounting the output mechanism housing 51 thereto.

In this embodiment, the fixing screws 33 are threadedly engaged with female screw portions formed in the mounting housing 9A from the drive control device 8 side. However, the female screw portions may be formed in the mounting flanges 47a of the motor housing 10A by burring processing or the like so that the fixing screws 33 are threadedly engaged from the mounting housing 9A side.

The drive control device 8 includes a heat sink portion 19A, which is a die-cast product made of an aluminum alloy, and bonded and fixed to a bottom surface 36 of the motor housing 10A, which is on the side opposite to the opening portion, a control board 26 made of glass epoxy on which a microcomputer 24 and an FET drive circuit 25 are mounted, and two sets of inverter portions 27a and 27b, each including power elements such as power MOSFETs mounted so as to correspond to three phases.

The drive control device 8 also includes a lead frame 28 formed between the control board 26 and the inverter portions 27a and 27b by resin insertion molding integrally with terminals (not shown) made of copper for supplying electric power to the inverter portions 27a and 27b, terminals (not shown) made of copper for connecting the inverter portions 27a and 27b, a capacitor (not shown), and a coil (not shown) to each other, terminals (not shown) made of copper for connecting a signal connector 43, the control board 26, a power connector 42, and the inverter portions 27a and 27b to each other, and a cover 23 having an end surface joined to a circumferential edge portion of the heat sink portion 19A, which is on the side opposite to the motor 2, for covering the control board 26, the inverter portions 27a and 27b, the lead frame 28, and the like.

The inverter portions 27a and 27b are respectively held in close contact with projecting portions 29a and 29b of the heat sink portion 19A, which project in the axial direction. Therefore, heat generated from the power elements provided on the inverter portions 27a and 27b is transferred to the heat sink portion 19A. The inverter portion 27a includes an inverter-portion signal terminal 30a and an inverter-portion motor terminal 31a, whereas the inverter portion 27b includes an inverter-portion signal terminal 30b and an inverter-portion motor terminal 31b. The inverter-portion signal terminals 30a and 30b are electrically connected to the control board 26, whereas the inverter-portion motor terminals 31a and 31b are respectively electrically connected to the motor terminals 32a and 32b.

According to the electric power steering device 1 having the configuration described above, the motor housing 10A is made of steel. Therefore, as compared to the related-art motor housing made of aluminum, physical strength is increased to allow a thickness of the motor housing 10A to be reduced. As a result, an outer diameter of the electric power steering device 1 can be reduced, while a weight thereof can be reduced.

Therefore, by using the electric power steering device according to this embodiment to be mounted in a vehicle, for assisting a steering force by a driver, the effects of improving fuel efficiency of the vehicle to reduce an exhaust amount of carbon dioxide are obtained.

Moreover, the motor housing 10A is made of steel. Therefore, a difference in linear expansion coefficient between the motor housing 10A and the stator core 3 formed of the electromagnetic steel plates and housed inside the motor housing 10A is small. Therefore, even when a change in temperature occurs, a gap is scarcely generated between the motor housing 10A and the stator core 3 due to a difference in linear expansion coefficient. Thus, the stator core 3 can be reliably retained and fixed to the motor housing 10A even under high-temperature environments.

Moreover, the mounting housing 9A is a cast member. Therefore, the degree of freedom in shape is high. Thus, the design can be easily changed in accordance with the shape of the output mechanism housing 51 for housing the speed-reduction mechanism therein. As a result, manufacturing costs of the electric power steering device 1 can be lowered.

Moreover, the mounting housing 9A is joined to the opening portion of the motor housing 10A by using the fixing screws 33, which are the joint means. Therefore, there is no excessive projection in the radial direction of the electric power steering device 1. As a result, an outer shape of the electric power steering device 1 can be reduced.

Moreover, the mounting flanges 47a with which the fixing screws 33 are threadedly engaged are formed in the opening portion of the motor housing 10A. Therefore, the mounting flanges 47a can be easily formed integrally with the motor housing 10A by press working or the like.

Moreover, the fitting portion 45a, which extends in the axial direction so as to be held in close contact with the inner wall surface of the motor housing 10A, is formed on the mounting housing 9A. Therefore, the coaxiality with the motor housing 10A is easily ensured. In addition, a contact area with the motor housing 10A is increased. Therefore, the joint strength and airtightness are easily ensured.

Moreover, the rib 46, which projects radially outward, is formed on the outer circumferential edge portion of the opening portion of the motor housing 10A. Therefore, the strength of the motor housing 10A can be further improved, while a contact area with the mounting housing 9A is increased. As a result, the airtightness is easily ensured.

Moreover, the heat sink portion 19A of the drive control device 8, which has the same diameter as that of the motor housing 10A, is joined to the bottom surface 36 of the motor housing 10A, which is on the side opposite to the opening portion. Therefore, the drive control device 8 does not project radially from the motor housing 10A. Thus, the outer shape of the electric power steering device 1 can be reduced.

Further, the rear bearing box portion 22 for retaining the rear bearing 21 is formed on the bottom portion of the motor housing 10A, which is on the side opposite to the opening portion. Therefore, a new member is not required for the rear bearing box portion 22. Thus, the manufacturing costs of the electric power steering device 1 can be lowered.

Second Embodiment

Figure 5:
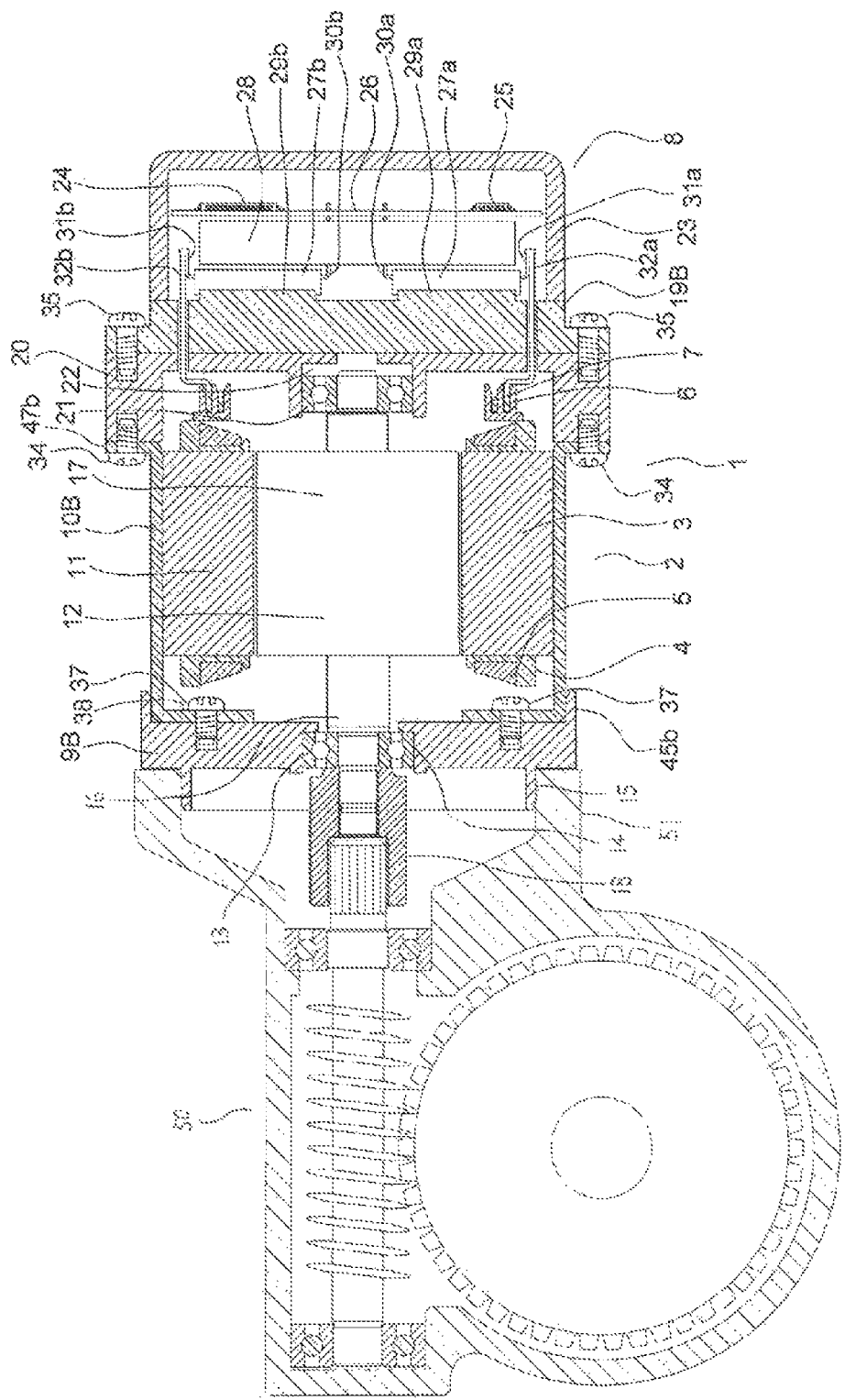
FIG. 5 is a sectional view illustrating an electric power steering device according to a second embodiment of the present invention, which is cut along an axial direction.

FIG. 5 is a sectional view illustrating an electric power steering device 1 according to a second embodiment of the present invention, which is cut along an axial direction.

In this embodiment, a motor housing 10B includes a bent portion 38, which is bent inward and formed on an end portion of an opening portion thereof on a mounting housing 9B side.

The motor housing 10B is fixed to the mounting housing 9B, which is a die-cast product made of an aluminum alloy, by fixing screws 37, which are joint means, through the bent portion 38.

A fitting portion 45b, which extends in the axial direction so as to be held in close contact with an outer circumferential wall surface of the motor housing 10B on the output shaft side, is formed on an outer circumferential edge portion of the mounting housing 9B.

In a central portion of the mounting housing 9B, the front bearing box portion 14 is formed. In the front bearing box portion 14, the front bearing 13 for rotationally supporting the one end portion of the output shaft 16 of the rotator 12 is housed.

Moreover, the mounting housing 9B includes the mounting flanges 44 formed at two positions, which radially project so as to be opposed to each other, and the fitting portion 15 for mounting the output mechanism housing 51 thereto.

Although the fixing screws 37 are threadedly engaged with female screw portions formed in the mounting housing 9B from the motor 2 side in FIG. 5, the female screw portions may also be formed in the bent portion 38 of the motor housing 10B by burring processing or the like so that the fixing screws 37 are threadedly engaged from the mounting housing 9B side.

A mounting flange 47b, which is bent radially outward, is formed on an opening portion of the motor housing 10B, which is on the side opposite to the bent portion 38. An end surface of a rear-side housing 20, which is a die-cast product made of an aluminum alloy, is held in surface contact with the mounting flange 47b. The motor housing 10B is joined to the rear-side housing 20 by using fixing screws 34, which are the joint means, through the mounting flange 47b. In a central portion of the rear-side housing 20 having a concave shape, the rear bearing box portion 22, which houses the rear bearing 21 for rotationally supporting the another end portion of the output shaft 16 of the rotator 12, is formed.

The rear-side housing 20 is joined to a heat sink portion 19B of the drive control device 8 by fixing screws 35. The heat sink portion 19B is a die-cast product made of an aluminum alloy. An end surface of the cover 23 is joined to the heat sink portion 19B.

Although the rear-side housing 20 and the heat sink portion 19B are coupled to each other by the fixing screws 35 in FIG. 5, the coupling may be performed by bonding, caulking, or the like.

Moreover, although the rear-side housing 20 and the heat sink portion 19B are constructed as separate members in FIG. 5, the rear-side housing 20 and the heat sink portion 19B may be constructed integrally.

The remaining configuration is the same as that of the electric power steering device 1 according to the first embodiment.

According to the electric power steering device 1 of this embodiment, the same effects as those obtained by the electric power steering device 1 of the first embodiment can be obtained. In addition, the following effects can also be obtained.

The motor housing 10B and the mounting housing 9B are joined to each other by using the fixing screws 37 through the bent portion 38, which is bent to the inner-diameter side. Therefore, there is no excessive projection on the radially outer side of the motor housing 10B. Thus, the outer shape of the electric power steering device 1 can be reduced.

Moreover, the motor housing 10B includes the bent portion 38 formed on one opening portion and the mounting flange 47b formed on another opening portion. The bent portion 38 and the mounting flange 47b can be easily formed integrally with the motor housing 10B by press working or the like.

Moreover, the fitting portion 45b, which extends in the axial direction so as to be held in close contact with the outer circumferential surface of the motor housing 10B, is formed on the mounting housing 9B. Therefore, the coaxiality with the motor housing 10B is easily ensured, while a contact area with the motor housing 10B is increased. As a result, the joint strength and airtightness are easily ensured.

Moreover, the rear-side housing 20 for supporting the one end portion of the output shaft 16 is provided between the motor 2 and the drive control device 8. Therefore, as compared to the first embodiment in which the one end portion of the output shaft 16 is supported by the motor housing 10A, a thickness of the motor housing 10B can be reduced.

Moreover, the heat sink portion 19B is joined to the rear-side shouting 20 by the fixing screws 35. Therefore, as compared to the first embodiment in which the heat sink portion 19A is joined to the bottom surface 36 of the motor housing 10A with an adhesive, the heat sink portion 19B is more reliably joined.

Third Embodiment

Figure 6:
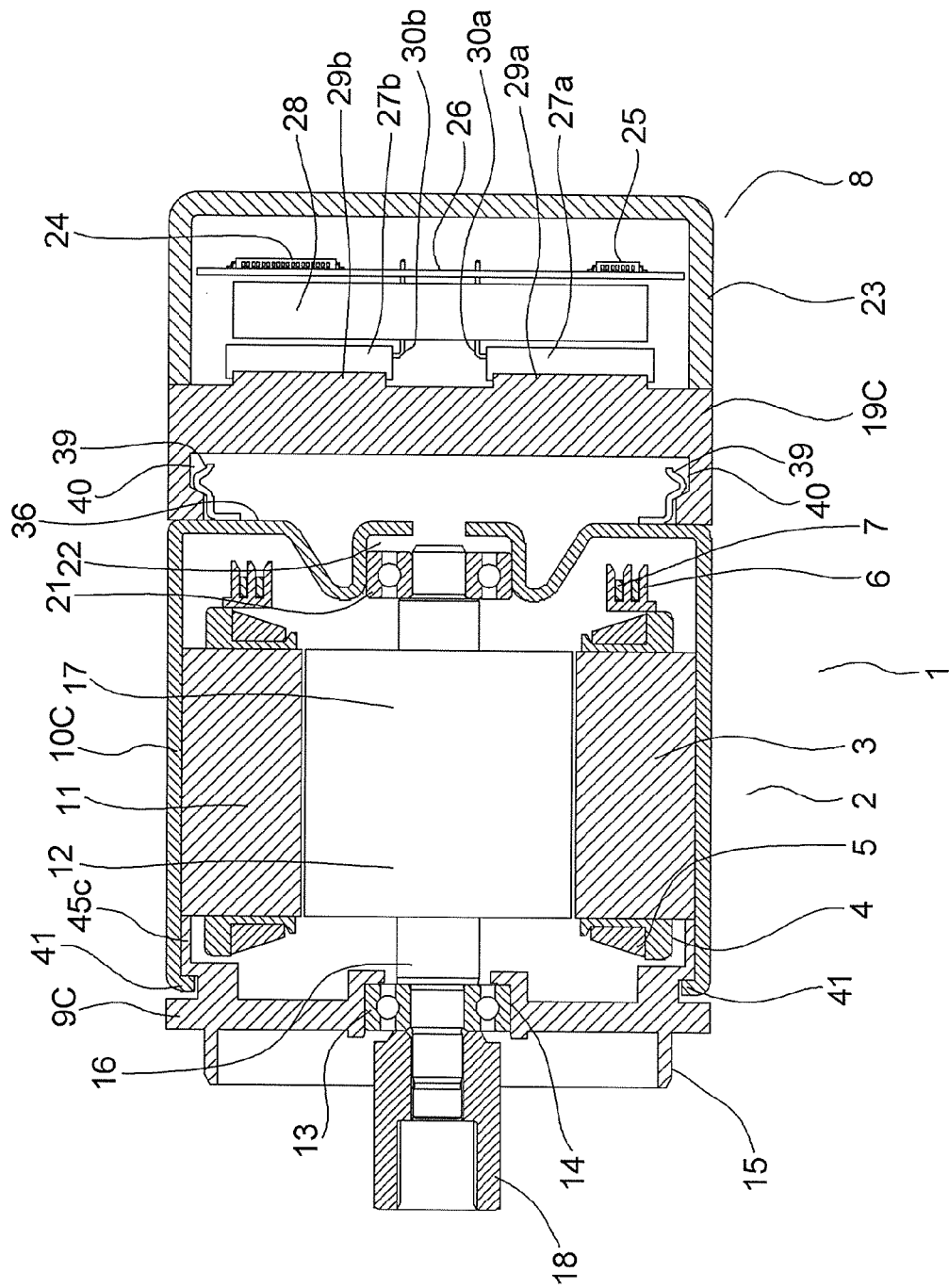
FIG. 6 is a sectional view illustrating an electric power steering device according to a third embodiment of the present invention, which is cut along an axial direction.

FIG. 6 is a sectional view illustrating an electric power steering device 1 according to a third embodiment of the present invention, which is cut along an axial direction.

In this embodiment, a motor housing 10C has a cylindrical shape with an opening portion on the speed-reduction mechanism side and a closed end on the drive control device 8 side. In a central portion of a bottom portion of the motor housing 10C, the rear bearing box portion 22, which houses the rear bearing 21 for rotationally supporting the another end portion of the output shaft 16, is formed.

On the bottom surface 36 of the motor housing 10C, engaging members 39 having spring property are mounted by welding or the like. The engaging members 39 are brought into engagement with a target engagement portion 40 formed on a heat sink portion 19C of the drive control device 8 so as to fixedly join the motor housing 10C and the heat sink portion 19C to each other. The heat sink portion 19C is a die-cast product made of an aluminum alloy. The end surface of the cover 23 is joined to the heat sink portion 19C.

A mounting-housing 9C side of the motor housing 10C is open as in the case of the motor housing 10A of the first embodiment.

The mounting housing 9C, which is a die-cast product made of an aluminum alloy, is coupled to the motor housing 10C by caulking an end portion 41 of the opening portion of the motor housing 10C.

A fitting portion 45c, which extends in the axial direction so as to be held in close contact with an inner circumferential surface of the opening portion of the motor housing 10C, is formed on the mounting housing 9C.

Although the motor housing 10C is caulked so as to be coupled to the mounting housing 9C in FIG. 6, the mounting housing 9C may be caulked to the motor housing 10C.

The remaining configuration is the same as that of the electric power steering device 1 according to the first embodiment.

According to the electric power steering device 1 of this embodiment, the same effects as those obtained by the electric power steering device 1 of the first embodiment can be obtained. In addition, the following effects can also be obtained.

The motor housing 10C and the mounting housing 9C are easily joined to each other by caulking inward the end portion 41 of the motor housing 10C without using fixing screws. Therefore, there is no excessive projection in the radial direction. Thus, the outer shape of the electric power steering device 1 can be reduced.

Moreover, the fitting portion 45c is formed on the mounting housing 9C. Therefore, the coaxiality with the motor housing 10C is easily ensured. In addition, a contact area with the motor housing 10C is increased. As a result, the joint strength and airtightness are easily ensured.

Moreover, the heat sink portion 19C is fixedly joined to the bottom surface 36 of the motor housing 10C through engagement of the engaging members 39 with the target engagement portion 40. Therefore, as compared to the first embodiment in which the heat sink portion 19A is joined to the bottom surface 36 of the motor housing 10A with the adhesive, the heat sink portion 19C is more reliably joined.

Fourth Embodiment

FIG. 7 is a sectional view illustrating an electric power steering device 1 according to a fourth embodiment of the present invention, which is cut along an axial direction.

In this embodiment, a motor housing 10D has a cylindrical shape with opening portions on both the mounting housing 9A side and the drive control device 8 side.

The mounting housing 9A, which is provided on the mounting housing 9A side of the motor housing 10D, is the same as that of the first embodiment. The mounting housing 9A is fixed to the motor housing 10D by the fixing screws 33 threadedly engaged with the mounting flanges 47a.

Moreover, the rib 46, which projects radially, is formed along the entire circumference of an outer circumferential edge portion of the opening portion of the motor housing 10D on the mounting housing 9A side. The mounting flanges 47a, each projecting radially, are formed at four positions on the outer circumferential edge portion.

The rear-side housing 20 provided to the opening portion of the motor housing 10D, which is on the drive control device 8 side, is the same as the rear-side housing 20 of the second embodiment.

The remaining configuration is the same as that of the electric power steering device 1 according to the first embodiment.

According to the electric power steering device 1 of this embodiment, the same effects as those obtained by the electric power steering device 1 of the first and second embodiments can be obtained. In addition, the following effects can also be obtained.

The mounting flanges 47a are formed on the opening portion of the motor housing 10D on the mounting housing 9A side. The mounting flange 47b is formed on the opening portion on the drive control device 8 side. The mounting flanges 47a and 47b can be easily formed integrally with the motor housing 10D by press working or the like.

Although the electric power steering device 1 has been described in each of the embodiments described above as the rotary electric machine having an integrated drive control device, it is apparent that the present invention is not limited to that described above and is also applicable to an air-conditioner compressor, a hydraulic pump, and the like.

REFERENCE SIGNS LIST 1 electric power steering device 1, 2 motor, 3 stator core, 4 insulator, 5 stator winding, 6 terminal holder, 7 winding terminal, 8 drive control device, 9A, 9B, 9C mounting housing, 10A, 10B, 10C, 10D motor housing, 11 stator, 12 rotator, 13 front bearing, 14 front bearing box portion, 15 fitting portion, 16 output shaft, 17 magnet, 18 boss, 19A, 19B, 19C heat sink portion, 20 rear-side housing, 21 rear bearing, 22 rear bearing box portion, 23 cover, 24 microcomputer, 25 FET drive circuit, 26 control board, 27a, 27b inverter portion, 28 lead frame, 29a, 29b projecting portion, 30a, 30b inverter-portion signal terminal, 31a, 31b inverter-portion motor terminal, 32a, 32b motor terminal, 33, 34, 35, 37 fixing screw (joint means), 36 bottom surface, 38 bent portion, 39 engaging member, 40 target engagement portion, 41 end portion, 42 power connector, 43 signal connector, 44 mounting flange, 45a, 45b, 45c fitting portion, 46 rib, 47a, 47b mounting flange

The invention claimed is:

1. A rotary electric machine having an integrated drive control device, the rotary electric machine comprising:
   a motor; and
   a drive control device provided on another end portion side of an output shaft of the motor, which is opposite to an output mechanism provided on one end portion side of the output shaft of the motor, for controlling drive of the motor,
   the motor and the drive control device being provided so as to be integrated with each other,
   the motor comprising:
      a stator including a stator core formed by laminating thin steel plates, around which a stator winding is wound;
      a rotator having the output shaft extending along a center axial line, and being provided rotatably on an inner-diameter side of the stator;
      a motor housing having a cylindrical shape, for housing the stator core therein; and
      a mounting housing being provided on the one end portion side of the output shaft so as to close an opening portion of the motor housing, and having mounted thereto an output mechanism housing for housing the output mechanism therein, the motor housing and the mounting housing being joined to each other by joint means, which is provided to the opening portion,
   the motor housing being made of a steel material,
   the mounting housing comprising a cast member,
   the joint means comprising a fixing screw provided to a bent portion formed on an end portion of the motor housing so as to be bent inward,
   the rotary electric machine further comprising a fitting portion being formed in a joint region in which the motor housing and the mounting housing are joined to each other, and extending along an axial direction so as to hold the motor housing and the mounting housing in close contact with each other, the fitting portion being in close contact with an outer circumferential wall surface of the motor housing.

2. A rotary electric machine having an integrated drive control device according to claim 1, wherein the motor housing comprises a rib formed on an outer circumferential edge portion of the opening portion.

3. A rotary electric machine having an integrated drive control device according to claim 1, further comprising a rear-side housing provided between the motor and the drive control device, for supporting another end portion of the output shaft, which is opposite to the output mechanism.

4. A rotary electric machine having an integrated drive control device according to claim 1, wherein the rotary electric machine having an integrated drive control device comprises an electric power steering device.

5. A rotary electric machine having an integrated drive control device according to claim 1, wherein the outer circumferential wall surface extends integrally and continuously from the motor housing.

* * * * *